United States Patent
Emigh et al.

(10) Patent No.: US 11,563,595 B2
(45) Date of Patent: Jan. 24, 2023

(54) HOME DEVICE CONTROLLER WITH TOUCH CONTROL GROOVES

(71) Applicant: Brilliant Home Technology, Inc., San Mateo, CA (US)

(72) Inventors: Aaron T. Emigh, San Mateo, CA (US); Steven Stanek, San Mateo, CA (US)

(73) Assignee: Brilliant Home Technology, Inc., San Mateo, CA (US)

( * ) Notice: Subject to any disclaimer, the term of this patent is extended or adjusted under 35 U.S.C. 154(b) by 0 days.

(21) Appl. No.: 15/861,655

(22) Filed: Jan. 3, 2018

(65) Prior Publication Data
US 2018/0191517 A1    Jul. 5, 2018

Related U.S. Application Data

(60) Provisional application No. 62/441,871, filed on Jan. 3, 2017.

(51) Int. Cl.
| | |
|---|---|
| *H04L 12/28* | (2006.01) |
| *G06F 3/01* | (2006.01) |
| *G06F 3/04883* | (2022.01) |
| *G06F 3/04847* | (2022.01) |
| *G06F 3/0354* | (2013.01) |
| *H05B 45/10* | (2020.01) |

(52) U.S. Cl.
CPC ............ *H04L 12/282* (2013.01); *G06F 3/017* (2013.01); *G06F 3/03547* (2013.01); *G06F 3/04847* (2013.01); *G06F 3/04883* (2013.01); *H05B 45/10* (2020.01); *G06F 2203/04809* (2013.01)

(58) Field of Classification Search
CPC ... H04L 12/282; G06F 3/017; G06F 3/03547; G06F 3/044; G06F 3/04847; G06F 3/04883; G06F 2203/04809; H05B 33/0845

USPC ........................................................ 715/771
See application file for complete search history.

(56) References Cited

U.S. PATENT DOCUMENTS

| 4,246,494 A | 1/1981 | Foreman |
| D283,404 S | 4/1986 | Heiler |

(Continued)

FOREIGN PATENT DOCUMENTS

| EP | 2308270 | 4/2011 | |
| WO | WO-2014/134637 A2 | 9/2014 | |
| WO | WO-2014134637 A2 * | 9/2014 | ......... H05B 33/0845 |

OTHER PUBLICATIONS

Control Units—part of. (Design—© Questel) orbit.com [online PDF] 3 pgs. Print Date Jan. 17, 2018. [Retrieved on Oct. 22, 2018] https://sobjprd.questel.fr/export/QPTUJ214/pdf2/3514a93a-3d9f-4c74-8e9c-d17ed033fcb5-173838.pdf.

(Continued)

*Primary Examiner* — Sherief Badawi
*Assistant Examiner* — Koorosh Nehchiri
(74) *Attorney, Agent, or Firm* — Mahamedi IP Law LLP

(57) ABSTRACT

A home device controller can include one or more touch grooves, a touch slider operatively coupled to each of the one or more touch grooves, and one or more processors. The processor(s) can receive signals from each touch sensor, each signal corresponding to a touch gesture performed by a user interacting with the one or more touch grooves. The processor(s) can generate control commands executable by a home device based at least in part on the signals, and transmit the control commands to the home device for execution.

11 Claims, 4 Drawing Sheets

(56) References Cited

U.S. PATENT DOCUMENTS

| | | | |
|---|---|---|---|
| 4,591,765 A | 5/1986 | Beck | |
| D288,921 S | 3/1987 | Peck | |
| D308,045 S | 5/1990 | Counts | |
| D312,974 S | 12/1990 | Conner | |
| D319,429 S | 8/1991 | D'Aleo | |
| D322,606 S | 12/1991 | Muller | |
| D343,381 S | 1/1994 | Inukai | |
| D344,684 S | 3/1994 | Metz | |
| D346,591 S | 5/1994 | Lee | |
| 5,336,979 A | 8/1994 | Watson | |
| D359,459 S | 6/1995 | Summa | |
| D360,235 S | 7/1995 | Emrys-Roberts | |
| D362,252 S | 9/1995 | Ansell | |
| D364,141 S | 11/1995 | Hanna | |
| D365,029 S | 12/1995 | Gaskell | |
| D366,217 S | 1/1996 | Dudley | |
| D386,986 S | 12/1997 | Gee, II | |
| D395,639 S | 6/1998 | Ham | |
| D413,073 S | 8/1999 | Brechbill | |
| D425,538 S | 5/2000 | Akaike | |
| D425,801 S | 5/2000 | Brechbill | |
| D452,695 S | 1/2002 | Miller | |
| D454,870 S | 3/2002 | Lee | |
| D461,802 S | 8/2002 | Tu | |
| D478,053 S | 8/2003 | Andre | |
| D482,094 S | 11/2003 | Burrows | |
| D493,148 S | 7/2004 | Shibata | |
| D503,402 S | 3/2005 | Su | |
| D505,344 S | 5/2005 | Roher | |
| D505,676 S | 5/2005 | Porter | |
| 6,888,537 B2 * | 5/2005 | Benson | G06F 3/0414 345/156 |
| D506,151 S | 6/2005 | Roher | |
| D514,527 S | 2/2006 | DiPasquale | |
| D520,073 S | 5/2006 | Stratton | |
| D523,823 S | 6/2006 | McLellan | |
| D524,279 S | 7/2006 | Lai | |
| 7,084,859 B1 * | 8/2006 | Pryor | G01C 21/3664 345/156 |
| D528,512 S | 9/2006 | Li | |
| D528,991 S | 9/2006 | Katsuyama | |
| D535,628 S | 1/2007 | Fort | |
| D535,951 S | 1/2007 | Fort | |
| D537,120 S | 2/2007 | Mandel | |
| D538,773 S | 3/2007 | Joung | |
| D541,800 S | 5/2007 | Ponnert | |
| D546,295 S | 7/2007 | Marchetto | |
| D551,664 S | 9/2007 | Lin | |
| D570,299 S | 6/2008 | Jacoby | |
| D572,208 S | 7/2008 | Mayo | |
| D572,227 S | 7/2008 | Yoon | |
| D572,667 S | 7/2008 | Mayo | |
| D574,436 S | 8/2008 | Mandel | |
| D585,094 S | 1/2009 | Smith | |
| 7,489,303 B1 * | 2/2009 | Pryor | B60K 35/00 345/173 |
| D589,002 S | 3/2009 | Magoni | |
| D595,664 S | 7/2009 | Simard | |
| D607,416 S | 1/2010 | Gentner | |
| D610,554 S | 2/2010 | Lanfear | |
| D615,045 S | 5/2010 | Lanfear | |
| D624,882 S | 10/2010 | Altonen | |
| D638,421 S | 5/2011 | Tsai | |
| D638,806 S | 5/2011 | Kim | |
| D639,804 S | 6/2011 | Hwang | |
| D640,992 S | 7/2011 | Margolin | |
| D642,572 S | 8/2011 | Kujawski | |
| D642,992 S | 8/2011 | Sasaki | |
| D643,318 S | 8/2011 | Morrow | |
| 8,008,591 B2 | 8/2011 | Shi | |
| D645,001 S | 9/2011 | Margolin | |
| D647,067 S | 10/2011 | Kim | |
| D651,530 S | 1/2012 | Baumgartner | |
| D658,591 S | 5/2012 | Margolin | |
| D662,837 S | 7/2012 | Morrow | |
| D662,838 S | 7/2012 | Morrow | |
| D662,839 S | 7/2012 | Morrow | |
| D662,840 S | 7/2012 | Morrow | |
| D663,224 S | 7/2012 | Morrow | |
| D669,866 S | 10/2012 | Gilbert | |
| D678,219 S | 3/2013 | Higashijima | |
| D679,664 S | 4/2013 | Piche | |
| D685,776 S | 7/2013 | Bau | |
| D689,825 S | 9/2013 | Wenji | |
| D690,696 S | 10/2013 | Jonsson | |
| D690,697 S | 10/2013 | Jonsson | |
| D690,698 S | 10/2013 | Jonsson | |
| D691,972 S | 10/2013 | Lin | |
| D694,211 S | 11/2013 | Yuu | |
| D696,635 S | 12/2013 | Asher | |
| D701,570 S | 3/2014 | Fletcher | |
| D706,230 S | 6/2014 | McMillen | |
| D709,055 S | 7/2014 | Cho | |
| D710,313 S | 8/2014 | Charleux | |
| D716,302 S | 10/2014 | Delgado | |
| D717,774 S | 11/2014 | Fathollahi | |
| D718,292 S | 11/2014 | Hemesath | |
| D718,308 S | 11/2014 | Nishizawa | |
| D720,306 S | 12/2014 | Altonen | |
| D722,055 S | 2/2015 | Jonsson | |
| D723,948 S | 3/2015 | Baumgartner | |
| D724,103 S | 3/2015 | Akana | |
| D724,547 S | 3/2015 | Baldwin | |
| D727,271 S | 4/2015 | Shi | |
| D728,527 S | 5/2015 | Kim | |
| D732,526 S | 6/2015 | Ferren | |
| D732,533 S | 6/2015 | Hirota | |
| D733,590 S | 7/2015 | Primiani | |
| D735,149 S | 7/2015 | Lin | |
| D735,681 S | 8/2015 | Altonen | |
| D735,717 S | 8/2015 | Lam | |
| D739,399 S | 9/2015 | Adamson | |
| D739,400 S | 9/2015 | Adamson | |
| D740,762 S | 10/2015 | Miller | |
| D743,349 S | 11/2015 | Leeland | |
| 9,198,259 B2 | 11/2015 | Hoang | |
| D746,280 S | 12/2015 | Bajwa | |
| D751,426 S | 3/2016 | Edgar | |
| 9,354,751 B2 | 5/2016 | Fisher | |
| D761,741 S | 7/2016 | Santiago | |
| 9,389,769 B1 | 7/2016 | O'Keeffe | |
| D763,205 S | 8/2016 | Kashimoto | |
| D766,240 S | 9/2016 | Le Rouzo | |
| D766,892 S | 9/2016 | Bajwa | |
| D767,553 S | 9/2016 | Fathollahi | |
| D773,456 S | 12/2016 | Mitchell | |
| D775,089 S | 12/2016 | Iaconis | |
| D778,244 S | 2/2017 | Feldstein | |
| D781,250 S | 3/2017 | Cartwright | |
| D782,471 S | 3/2017 | Nuk | |
| 9,655,172 B2 | 5/2017 | Sumi | |
| D789,306 S | 6/2017 | VanDuyn | |
| D789,897 S | 6/2017 | VanDuyn | |
| D824,383 S | 7/2018 | Wall | |
| D825,495 S | 8/2018 | Yagisawa | |
| D826,180 S | 8/2018 | Stray | |
| D827,455 S | 9/2018 | Farenski | |
| 10,102,742 B2 | 10/2018 | Dimberg | |
| D842,713 S | 3/2019 | Erbacher | |
| 10,524,339 B2 | 12/2019 | Hung | |
| D873,265 S | 1/2020 | Wall | |
| D882,528 S | 4/2020 | Fariello | |
| 10,645,777 B2 | 5/2020 | Casey | |
| D886,749 S | 6/2020 | Emigh | |
| D911,983 S | 3/2021 | Chen | |
| 2004/0080682 A1 | 4/2004 | Dalton | |
| 2004/0183788 A1 | 9/2004 | Kurashima | |
| 2005/0064936 A1 * | 3/2005 | Pryor | G06F 3/0425 463/36 |
| 2005/0168435 A1 | 8/2005 | Reed | |
| 2006/0232269 A1 | 10/2006 | Sills | |
| 2007/0039810 A1 | 2/2007 | Chou | |
| 2007/0097090 A1 | 5/2007 | Battles | |

(56) References Cited

U.S. PATENT DOCUMENTS

| | | | | |
|---|---|---|---|---|
| 2007/0112939 | A1* | 5/2007 | Wilson | H04L 12/2807 709/219 |
| 2007/0291010 | A1 | 12/2007 | Altonen | |
| 2008/0024463 | A1* | 1/2008 | Pryor | B60R 11/0235 345/175 |
| 2008/0211779 | A1* | 9/2008 | Pryor | G01C 21/3664 345/173 |
| 2009/0197442 | A1 | 8/2009 | Wei | |
| 2009/0267921 | A1* | 10/2009 | Pryor | G06F 3/04883 345/177 |
| 2009/0273574 | A1* | 11/2009 | Pryor | G06F 3/016 345/173 |
| 2010/0018844 | A1 | 1/2010 | Sanford | |
| 2010/0141153 | A1* | 6/2010 | Recker | H05B 45/00 315/149 |
| 2010/0182137 | A1* | 7/2010 | Pryor | G06F 3/0425 340/425.5 |
| 2011/0037725 | A1* | 2/2011 | Pryor | G01C 21/3664 345/174 |
| 2011/0074672 | A1* | 3/2011 | Diederiks | H05B 47/105 345/156 |
| 2011/0298392 | A1 | 12/2011 | Goyal | |
| 2013/0141009 | A1* | 6/2013 | Jin | G08C 17/02 315/292 |
| 2013/0191711 | A1 | 7/2013 | Tashman | |
| 2013/0257315 | A1* | 10/2013 | Restrepo | H05B 47/10 307/112 |
| 2014/0108019 | A1* | 4/2014 | Ehsani | H04L 12/282 704/275 |
| 2014/0253483 | A1* | 9/2014 | Kupersztoch | H04L 12/282 345/173 |
| 2014/0267068 | A1* | 9/2014 | Smith | G06F 3/04883 345/173 |
| 2014/0303841 | A1* | 10/2014 | Frojdh | H04M 1/72583 701/36 |
| 2015/0035776 | A1 | 2/2015 | Yamazaki | |
| 2015/0077363 | A1 | 3/2015 | Yairi | |
| 2015/0346702 | A1 | 12/2015 | Camden | |
| 2016/0043905 | A1* | 2/2016 | Fiedler | G06F 3/0482 715/736 |
| 2016/0054822 | A1* | 2/2016 | Suzuki | G06F 3/03547 345/173 |
| 2016/0140629 | A1 | 5/2016 | Kallio | |
| 2016/0242264 | A1* | 8/2016 | Pakkala | H05B 45/10 |
| 2017/0284618 | A1 | 10/2017 | Reynolds | |
| 2017/0359190 | A1* | 12/2017 | Nadathur | H04L 67/303 |
| 2018/0011561 | A1 | 1/2018 | Kawaguchi | |
| 2018/0014389 | A1 | 1/2018 | Lim Chi Cheung | |
| 2018/0070430 | A1 | 3/2018 | Edwards | |
| 2018/0088770 | A1* | 3/2018 | Brombach | G06F 3/0488 |
| 2018/0228003 | A1 | 8/2018 | O'Driscoll | |
| 2018/0307362 | A1 | 10/2018 | Komala | |
| 2019/0042000 | A1 | 2/2019 | Kasmieh | |
| 2019/0058014 | A1 | 2/2019 | Park | |
| 2019/0235684 | A1 | 8/2019 | Zhang | |
| 2019/0280891 | A1* | 9/2019 | Pognant | H04L 12/2803 |
| 2020/0285316 | A1 | 9/2020 | Park | |
| 2021/0210939 | A1 | 7/2021 | Emigh | |

OTHER PUBLICATIONS

International Search Report and Written Opinion from PCT Application No. PCT/US18/12273, dated Apr. 19, 2018, 7 pages.

Extended European Search Report dated Aug. 10, 2020, Application No. 18735783.5 9 pages.

Coolthings, Brilliant Control Manages Your Smart Home Straight From The Light Switch; Feb. 13, 2017; 2 pgs; https://www.coolthings.com/brilliant-control-smart-home-switch-hub/.

"Brilliant Smart Home Control (1-Switch Panel)—Alexa Built-In & Compatible with Ring, Sonos, Hue, Kasa/TP-Link, Wemo, SmartThings, Apple HomeKit—In Wall Touchscreen Control for Lights, Music & More", first available Apr. 12, 2018. Amazon.com [https://www.amazon.com/Brilliant-Control-Lighting-Switc (Year: 2018) h-Version/dp/B07C52PJH4?th=1].

* cited by examiner

HOME DEVICE CONTROLLER WITH TOUCH CONTROL GROOVES

CROSS REFERENCE TO RELATED APPLICATION

This application claims the benefit of priority to U.S. Application No. 62/441,871, entitled "Home Control with Capacitive Touch Grooves," filed on Jan. 3, 2017; which is hereby incorporated by reference in its entirety.

BACKGROUND

Home control systems, such as lighting control systems used for lighting fixtures, include binary analog switches and analog dimmer switches that enable users to control one or more lights wired to an electrical box upon which such switches are connected. Control of these switches can be cumbersome and/or unattractive, and it would therefore be useful to have improved means of controlling them.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
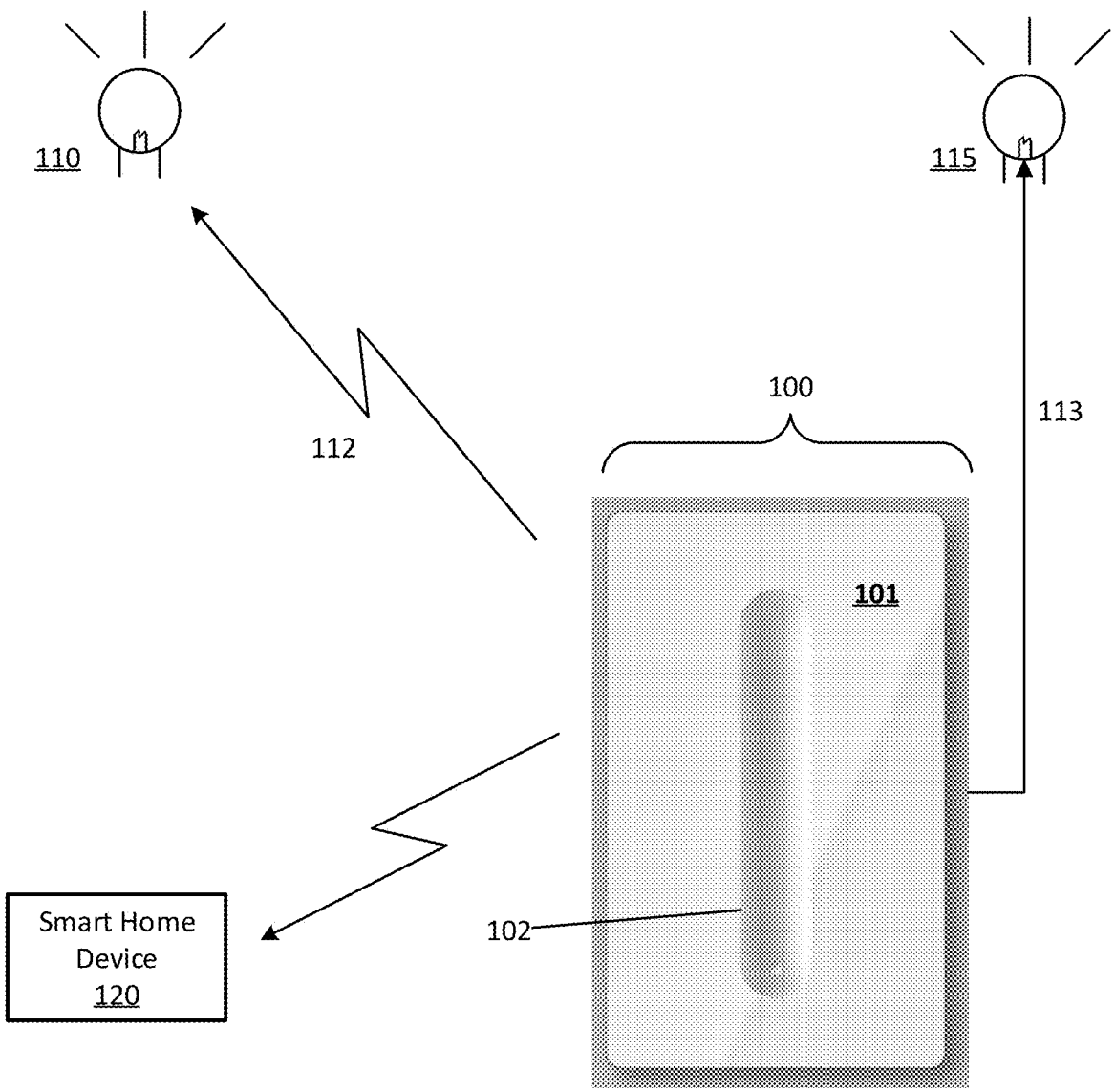
FIG. 1 illustrates an example of a home device controller including a touch control panel include a touch control groove, according to various embodiments.

Examples of lighting control systems described herein can be implemented in numerous ways, including as a process, an apparatus, a system, a composition of matter, a computer readable medium such as a computer readable storage medium or a computer network wherein program instructions are sent over one or more communication links. In this specification, these implementations, or any other form that examples of implementations may take, may be referred to as techniques. In general, the order of the steps of disclosed processes may be altered within the scope of the embodiments described herein.

A detailed description of one or more embodiments is provided below. The embodiments described herein can encompass numerous alternatives, modifications and equivalents. Numerous specific details are set forth in the following description in order to provide a thorough understanding of the described embodiments.

Among other benefits, the examples described herein achieve a technical effect of utilizing existing home gangbox wiring for light switches to provide a smart home lighting control panel that interconnects (wirelessly and/or wired) to a number of home devices that can then be controlled via the lighting control panel. Examples described herein replace analog light switches with a digital touch panel including one or more touch grooves and/or a touch screen providing advancements in user home experiences.

As used herein, a home device controller can comprise a computing device and can provide network connectivity and processing resources for communicating with a system of lighting controllers over one or more networks. The home device controller can also correspond to custom hardware, in-vehicle devices, or on-board computers, etc. The computing device can also operate a designated application configured to communicate with a network of home devices.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as CD or DVD units, flash memory (such as those carried on smartphones, multifunctional devices or tablet computers), and magnetic memory. Computers, terminals, network enabled devices (e.g., mobile devices or home device controllers described herein) are all examples of machines and devices that utilize processors, memory, and instructions that may be stored on computer-readable mediums. Additionally, examples may be implemented in the form of computer-programs, or a computer usable carrier medium capable of carrying such a program.

System Description

FIG. 1 illustrates an example of a home device controller including a touch groove control panel, according to various embodiments. The example shown in FIG. 1 is a frontal view of the home device controller 100 that includes touch control panel 101. According to one or more examples, a home device controller 100 may provide the capability for a user to control lighting levels. In some embodiments, touch control panel 101 may be the size of a Decora switch (e.g. 1.31×2.63 inches) and may fit inside a standard Decora light switch cover. In some embodiments, home device controller 100 may be the size of a standard, midway, or jumbo light switch cover. In some embodiments, the forward-facing layer of home device controller 100 may be a single piece of nonconductive material such as plastic (including nylon, polycarbonate, ABS, etc.), which in some embodiments may be injection molded. Touch control panel 101 may be a component of a home device controller 100 that includes AC electronics as discussed below, and may be mounted in a wall, e.g. of a building such as a home or business.

A control groove 102, or touch control groove 102, can be formed on the touch control panel 101 of the home device controller 100 and may provide the capability to adjust lighting or control functions other devices. A touch sensor, such as a capacitive touch sensor or a combination of a plurality of capacitive touch sensors, may be placed underneath or otherwise coupled to the control groove 102. For example, the touch sensor may be embedded in a printed circuit board (e.g., made of glass-reinforced epoxy laminate sheets, such as FR4) or in polyimide film such as Kapton, which in some embodiments may be integrated with a flex connector.

The touch sensor may be configured to perform in a "slider" configuration, examples of which are discussed in Atmel Corporation document number QTAN0079, "Buttons, Sliders, and Wheels: Sensor Design Guide," available via the Internet from Atmel, which is hereby incorporated herein by reference for all purposes as if set forth in full. Further details are available in Paul Russel, "Atmel QTouch Layout Quick Reference," available via the Internet from Atmel, which is hereby incorporated herein by reference for all purposes as if set forth in full. Touch sensor configurations may be implemented utilizing any combination of capacitive touch sensors, such as CapTIvate™ capacitive touch sensor technology developed by Texas Instruments, examples of which are discussed in "CapTIvate Technology Guide," in the section entitled "Design Guide," available via the Internet from Texas Instruments, which is hereby incorporated herein by reference for all purposes as if set forth in full. In some embodiments, a touch sensor may be configured as a "Mutual Capacitive Slider" as specified therein in the "Sliders and Wheels" chapter.

In certain examples, the touch sensor can comprise a capacitive touch slider, such as a planar or non-planar, self-capacitance or mutual capacitance, interdigitated X and Y electrodes, or flooded-X capacitive slider, and may be implemented behind the control groove 102. The touch sensor is connected to a touch controller. The touch controller can be a microcontroller such as an Atmel ATTiny, Texas Instruments MSP430 or a dedicated touch controller such as a Silicon Labs TouchXpress. The touch controller analyzes the capacitance of the touch sensor and generates digital or analog signals. Signals from the touch controller may be transmitted to a microprocessor, for example, using a Universal Asynchronous Receiver/Transmitter (UART), Inter-Integrated Circuit (I²C, specifications of which are available from NXP Semiconductors as document number UM10204, "I²C-bus specification and user manual," available via the Internet from NXP), or Serial Peripheral Interface bus (SPI, details of which are available from Byte Paradigm in their article available over the Internet entitled "Introduction to I²C and SPI protocols"), all of which are herein incorporated by reference in full for all purposes as if fully set forth herein.

In some embodiments, the control groove 102 may be between 60 mm and 80 mm in length, and may be horizontally sized for comfort using a typical finger (e.g., between 10 mm and 20 mm in width). The depth of the control groove 102 may be any dimension that provides visual and/or tactile indication of its location (e.g., between 1 mm and 10 mm). In some embodiments (e.g., where depth is at a premium), the depth may be between 1 mm and 3.5 mm (e.g., approximately 2.5 mm).

The material (e.g., plastic) at the basin (e.g., the maximum depth) of the control groove 102 may be relatively thin to optimize the sensitivity of the touch sensors behind the control groove 102 (e.g., between 0.25 mm and 2 mm). In some embodiments, the touch sensors may be bonded to a back portion of the home device controller 100 that comprises the control groove 102, or can be incorporated into the control groove 102. In some embodiments, the touch sensors may be behind the touch control groove 102 on a printed circuit board (PCB) (e.g., an FR4 PCB), or a Kapton film, such that there is little or no air gap therebetween (e.g. less than 2 mm). In some embodiments, the touch sensors may be mounted to an elastic material such as a foam, which may press the touch sensors against the back of the control groove 102 to eliminate any potential air gap.

A home device controller can include lighting control capability that may be integrated into the same module. For example, a home device controller can function as an AC dimmer, which commonly dims a light by chopping up or otherwise manipulating the output AC waveform on the "load" line going to a light by eliminating some portion of the output, relative to the input "line" AC, during a phase of the duty cycle (e.g., a "leading edge" or "trailing edge" dimmer which may chop out a part of the waveform either before or after zero crossings), resulting in a duty cycle that indicates the desired amount of dimming. In various embodiments, the home device controller 101 can perform such dimming using a triac or a field-effect transistor (FET), such as a MOSFET (e.g., a pair of FETs and/or MOSFETs), which may be under the control of a microcontroller or touch controller (e.g., an Atmel ATTiny or ATMega) that receives instructions on a desired on/off/dimming level state and adjusts its outputs accordingly.

In some embodiments, a home device controller may utilize DC power for lighting (e.g., 10V, 12V, or 24V) in which the output voltage may be varied. In some embodiments, the home device controller can utilize a Digital Addressable Lighting Interface (DALI) for controlling a light, for example, as discussed in technical standards IEC 62386 and IEC 60929, which are incorporated herein by reference in their entirety for all purposes as if fully set forth. In some embodiments, the home device controller can transmit lighting control commands, corresponding to a specified on/off/dimming state, based on touch gestures on the control groove 102 using a wireless network such as WiFi, Zigbee, Z-Wave, or Bluetooth (including BLE).

Touch gestures may be performed by a user in the control groove 102, and interpreted by the microprocessor to generate the lighting control commands. In particular, one-dimensional touch gestures such as taps, flicks, and slides may be detected. The microprocessor can detect touch gestures by analyzing the signals corresponding to gestures performed on the touch control groove 102. The signals can be received by the microprocessor over a specific interface (e.g., UART, I²C, SPI, etc. as described above) used for communication between the touch controller(s) and the microprocessor. At the microprocessor (which in some embodiments may be a general-purpose microprocessor, and in some embodiments may be a microcontroller, and in some embodiments may be a combination of one or more microprocessors and/or microcontrollers acting in concert, and in some embodiments, may be a touch sensor specific integrated circuit incorporating, or connected to, one or more of these processing configurations), the signals may be interpreted to determine positions and times at which a finger is detected (or ceases to be detected), and from which the microprocessor can calculate touch velocities, accelerations, touch pressure, and touch position on the control groove 102. The microprocessor can combine the touch positions, times, velocities, etc. to derive gestures can generate corresponding control commands for connected lighting devices or other home devices. In some embodiments, machine learning techniques may be applied to create gesture recognizer models using training data of touch gestures and corresponding classifications, e.g. from a plurality of people. Examples of such training are provided in Hao Lu and Yang Li, "Gesture Coder: A Tool for Programming Multi-Touch Gestures by Demonstration," published in the Proceedings of the SIGCHI Conference on Human Factors in Computing Systems 2012, pages 2875-2884, and available over the Internet from Google Research; and in Daniel Wood, "Methods for Multi-Touch Gesture Recognition," published in the Proceedings of the 20$^{th}$ Annual ACM Symposium on User Interface Software and Technology (2007), both of which are included herein by reference for all purposes as if set forth in full. Examples of suitable machine learning techniques are well known to those in the art and include generation of state machines, Hidden Markov Models, Support Vector Machines, Bayesian Networks, Artificial Neural Networks, and Dynamic Time Warping.

Examples of such gestures a user can perform on the control groove 102, in which examples of how to detect such gestures are provided by way of illustration, in which an illustrative implementation is presumed to provide values of 0-1000 indicating where along a touch groove or area a finger is detected, with 0 being at the bottom, this example being purely illustrative, and for example interpretable in percentage terms, as those skilled in the art will readily appreciate, can include:

Tap—which in some illustrative embodiments may be implemented by detecting a finger's presence in the groove, followed by detection of its absence, with a change of less than 10.

Flick up (quick movement)—which in some illustrative embodiments may be implemented by detecting that a finger is in contact for less than 300 ms, with its final point of contact determined to be between 10 and 100 greater than the initial point of contact.

Flick down (quick movement)—which in some illustrative embodiments may be implemented by detecting that a finger is in contact for less than 300 ms, with its final point of contact determined to be between 10 and 100 less than the initial point of contact.

Swipe up (slower than flick)—which in some illustrative embodiments may be implemented by detecting that a finger is in contact for at least 300 ms and/or travels a distance of at least 100, and has a point of contact that increases over time relative to the initial point of contact. In some embodiments, when a swipe up is detected, values may be incrementally provided as they change, for example to facilitate interactive dimming, volume adjustment, or other forms of control. In some embodiments, a swipe up may become a swipe down, enabling bidirectional adjustments, by detecting that the point of contact has begin to decrease over time relative to its previous point(s) of contact.

Swipe down (slower than flick)—which in some illustrative embodiments may be implemented by detecting that a finger is in contact for at least 300 ms and/or travels a distance of at least 100, and has a point of contact that decreases over time relative to the initial point of contact. In some embodiments, when a swipe up is detected, values may be incrementally provided as they change, for example to facilitate interactive dimming, volume adjustment, or other forms of control. In some embodiments, a swipe down may become a swipe up, enabling bidirectional adjustments, by detecting that the point of contact has begin to increase over time relative to its previous point(s) of contact.

Hold and move up—which in some illustrative embodiments may be implemented as described above for Swipe up, with the initial contact triggering detection.

Hold and move down—which in some illustrative embodiments may be implemented as described above for Swipe down, with the initial contact triggering detection.

Palm detection—which in some illustrative embodiments may be implemented as detecting presence of touch over a width too large to correspond to a human finger (e.g. 20 mm), which in some embodiments may cause the event to be ignored as unintentional.

In some embodiments, the microcontroller can interpret a hold and move gesture in the same manner as a swipe gesture. Gestures may be mapped to lighting control actions, for example as follows:

| Gesture | Action |
| --- | --- |
| Tap | Toggle on/off |
| Flick up | On (in various embodiments, to last "on" dimming level, to maximum, and/or to preset level) |
| Flick down | Off |
| Swipe up/Hold & move/slow swipe up | Interactively adjust dim level corresponding to movement (up = higher light level, down = lower light level). This may begin from the current dim level (i.e. when the light is "on" when the gesture is recognized) or from the minimum dim level (i.e. when the light is "off" at the time the gesture is recognized) |
| Swipe down/Hold & move/slow swipe down | Interactively adjust dim level corresponding to movement (up = higher light level, down = lower light level). This may begin from the current dim level. |

In various examples, the microcontroller or touch controller can assign numerical values to the dimming level of lights in a predetermined range 0 . . . n, where 0 represents "off" and n represents a maximum value. On/off lights such as lights that are not dimmable or are otherwise configured not to be dimmed may have n=1 in some embodiments, or may use the same maximum value as an unrestricted dimmable light in some embodiments. The microcontroller can transmit the assigned numerical value to a module that sets the output level of the light. In various embodiments, the module can comprise a logical component of the same microprocessor, or can comprise a different microprocessor.

In some embodiments, lights may be calibrated to have a minimum and/or maximum dim value. The maximum dim value can correspond to a maximum brightness to which the light may be interactively dimmed. The minimum dim value can correspond to a minimum brightness "on" value to which the light can be dimmed (e.g., any increase in the dim level from a 0 "off" value may incur immediately setting the dim level to the minimum dim level, which may be adjusted upward therefrom, and any decrease in the dim level from the minimum level may incur immediately setting the dim level to a 0 "off" value).

The type of controllers used illustratively herein may be used for controlling other devices than lighting, which may in some embodiments be accomplished with the same gestures. For example, a fan may be turned on/off or have a spin level set, shades or blinds may be raised and lowered or drawn and undrawn, temperature may be set for a climate control system such as a thermostat, etc.

According to examples shown in FIG. 1, the home device controller 101 can be configured to operate one or more lights 110, 115. In one example, the user can perform gestures on the control groove 102, which the microprocessor of the home device controller 101 can interpret to control an on/off state and/or a dim level of the light(s) 110, 115. In various examples, the home device controller 101 can be configured to replace an existing light switch utilizing the same wiring as the light switch. In certain implementations, the home device controller 101 can interpret the gestures to generate light control commands for a light 115 using a wired connection 113, and/or for a light 110 (e.g., a smart bulb) using a wireless connection 112 (e.g., using WiFi, Zigbee, Z-Wave, or Bluetooth).

In some examples, the home device controller 101 can be connected (wirelessly or wired) to a smart-home device 120, such as an audio system, a fan, a temperature control system, or automatically controlled curtains or blinds. The microprocessor can interpret gestures performed on the control groove 102 to turn on/off and adjust, for example, the fan speed of a fan, the volume of an audio system, the room temperature, an open, closed or intermediate state of curtains, shades, or blinds, and the like.

Figure 2:
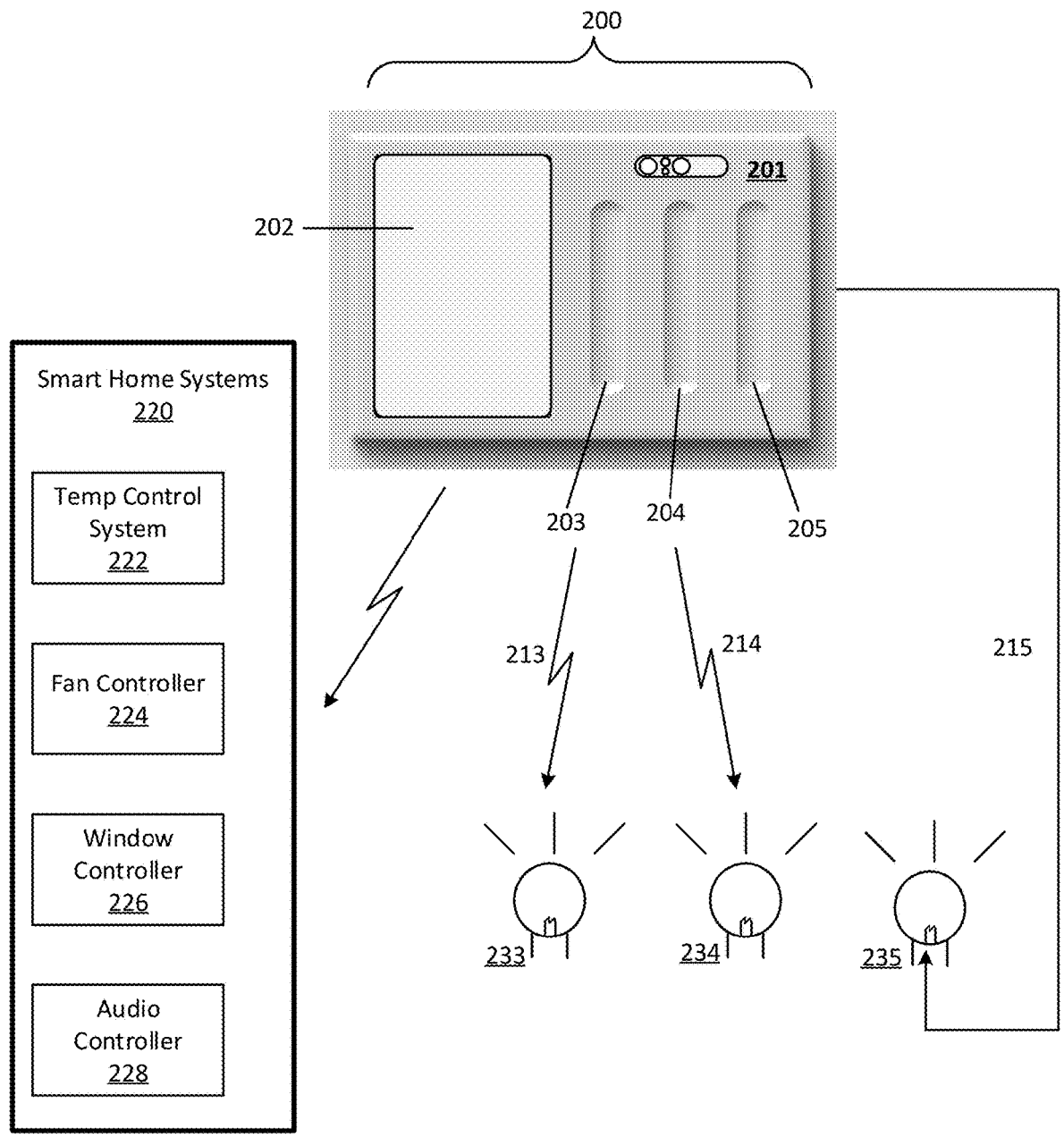
FIG. 2 illustrates an example of a home device controller including a touch control panel including multiple touch control grooves and a screen, according to various embodiments.

FIG. 2 illustrates another example of a home device controller, according to various embodiments. Referring to FIG. 2, a home device controller panel 201 includes a screen 202 and multiple touch control grooves 203, 204, 205. Home device controller 200 can include a touch control panel 201, and can further include AC electronics as discussed below. The home device controller 200 may be mounted in a wall, e.g. of a building such as a home or business. In some embodiments, the touch control panel 201 may include a removable bezel, e.g. a plastic bezel, that may be snapped on and off of the unit, thereby providing a capability for cosmetic changes, e.g. color changes, without necessitating replacement of the entire touch control panel 201.

The construction, configuration, and/or operation of the touch control grooves 203, 204, 205 may be as described for the touch control groove 102 shown and described with respect to FIG. 1. In some embodiments, multiple simultaneous gestures in a plurality of touch control grooves 203, 204, 205 may be interpreted simultaneously.

Connected to otherwise coupled to each touch control groove 203, 204, 205 may be a corresponding touch sensor or set of touch sensors (e.g., a capacitive touch slider). In touch slider embodiments, the touch sliders may be linked together using a bus such as I²C or SPI as described herein.

Each touch slider may be associated with a particular light circuit (e.g., the home device controller 200 may have multiple outputs, each of which can be assigned to a particular touch slider and therefore a particular corresponding touch control groove. Therefore, when the touch controller detects a gesture at a particular touch slider corresponding to a particular touch control groove, the touch controller can transmit a set of signals corresponding to the touch gesture to a microprocessor of the home device controller 200, which can generate a corresponding control command for the circuit corresponding to the touch slider and control groove combination. In some embodiments, such circuits may be physical circuits (e.g., AC or DC circuits as described above). In some embodiments, such circuits may be virtual circuits, wired or unwired, and the microprocessor can transmit the control instructions corresponding to the detected gesture, as described above using the applicable network (e.g., WiFi, Zigbee, Z-Wave, DALI, Bluetooth, etc.).

In an illustrative embodiment, software may provide a user interface on screen 202, or via a mobile application on a smartphone or a web site provided by a server, which provides the user with an option to map a particular touch control groove to a particular output, such as a physical lighting circuit connected to the home device controller 200, a physical lighting circuit connected to a different home device controller, or a third party device such as a smart bulb, an audio system, smart blinds or curtains, a thermostat, or a fan. When a device is selected to be mapped to a touch control groove, the home device controller 200 may be notified and may store a mapping in its memory (e.g. in non-volatile memory such as flash memory) that associates the device with an identifier associated with the touch control groove. Subsequently, when a gesture is detected in the touch control groove, the mapping may be consulted, or a state resulting from an earlier consultation of the mapping may be in place, and consequently the device may be controlled accordingly by the gesture in the touch control groove.

In the example shown in FIG. 2, the home device controller 200 can be mounted to replace an existing light switch panel, and can further utilize the existing load and line wires of the gang-box mounted within the wall behind the light switch panel. The home device controller 200 can include processing and memory resources as well as network communication modules implementing one or more network communications protocols. In certain aspects, one or more of the touch control grooves (e.g., control groove 205) can be associated with a wired connection 215 to a home device, such as a light element 235, e.g. via a direct wiring from a load wire attached to the home device controller. For such wired connections, the home device need not be a smart home device (e.g., including a controller and/or wireless communication module).

According to various examples, the screen 202 can comprise a touch screen and can enable the user to operate any number of connected smart home systems 220, such as smart light devices 233, 234, a temperature control system 222, a fan controller 224, a window controller 226, or an audio controller 228. In certain implementations, the user can select a particular smart home device on the touch screen 202 can utilize a touch control groove 203, 204 to turn on/off or adjust a particular adjustable parameter of the selected smart home device. In variations, the screen 202 itself can behave as a touch control groove, and the user can input gestures thereon to control a selected smart home device in accordance with the description provided herein (for example, using the Y axis reported by the touch screen as the position within a groove for touch gesture recognition as described above). In such embodiments, gesture recognition may be performed in the presence of other user interface elements being displayed on the screen, such as picture display, motion art display, selectable items such as scenes or devices, etc. In such embodiments, when a touch on the screen is detected, it may be determined whether the touch comprises a touch control gesture as discussed above. If so, then the appropriate functionality for that gesture may be performed, and if not, then the touch information may be relayed to other processing components for interpretation such as interactions with an on-screen user interface.

For example, if the user selects the temperature control system 222 on a displayed selectable menu on the touch screen 202, the microprocessor can be triggered to interpret gestures performed on the touch screen 202 as control commands for adjusting the room temperature. Thus, a touch-scroll gesture upwards on the touch screen 202 can cause the microprocessor to generate commands to increase the temperature of the room, and transmit those temperature control commands to the temperature control system 222.

In certain implementations, a touch control groove (e.g., control groove 203) can act as a dedicated control groove for a particular smart home device (e.g., light element 233). In such implementations, the user can perform gestures on the control groove 203, and the microprocessor of the home device controller 200 therein can interpret the gesture, generate control commands for the light element 233 in accordance with the gesture, and transmit the control commands to the light element 233 accordingly.

In variations, a touch control groove (e.g., control groove 204) can comprise a universal control groove 204 that can dynamically change connectivity between the various smart home systems 220 and/or light elements 233, 234 based on user selections from a displayed selectable menu on the screen. Furthermore, based on a user selection of a particular smart home device, the microprocessor therein can adaptively alter gesture interpretations for gestures performed on the control groove 204. For example, if the user selects the window controller 226 on the touch screen, the microprocessor can be triggered to interpret gestures performed on the control groove 204 as control commands for an actuator or servo operable to open or close window shades or blinds.

In further implementations, the touch screen 202 can graphically display dynamic content corresponding to the gestures being performed by the user on the touch screen 202 or a particular control groove 203, 204, 205, such as displaying a dynamic temperature setting, dim value, fan speed, window-shade setting, or volume.

The utilization of three touch control grooves 203, 204, 205 shown in FIG. 2 is purely illustrative, and it is contemplated that the same techniques described herein may be implemented for 2, 4, 5, 6, or more touch control grooves (and corresponding touch sliders).

Hardware Diagram

Figure 3:
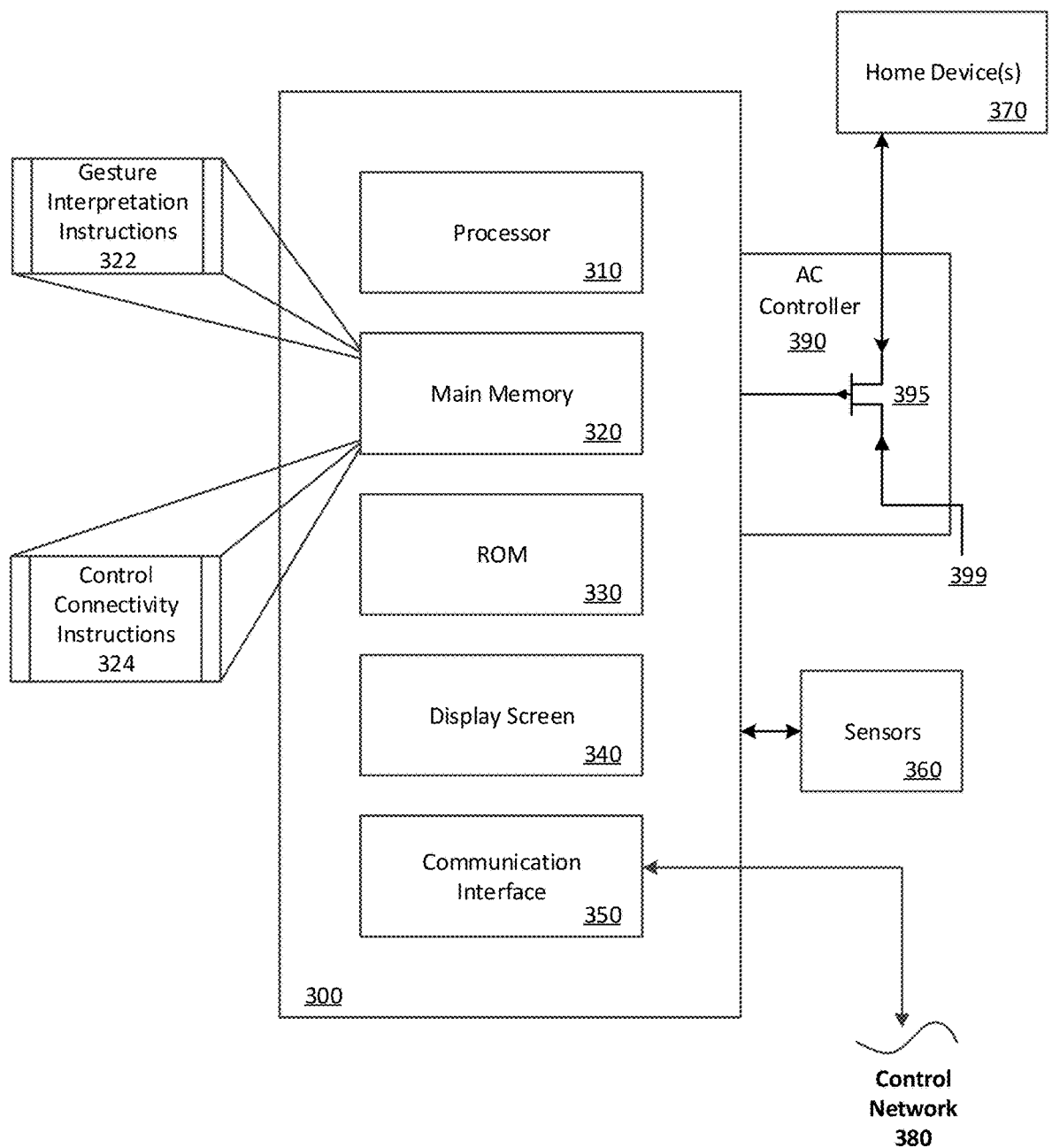
FIG. 3 is a hardware diagram illustrating an example of a computing device upon which example home device controllers described herein may be implemented.

FIG. 3 is a hardware diagram illustrating a computing device upon which example home device controllers described herein may be implemented. For example, the computing device 300 can comprise the logic and processing performed via user interaction with the home device controllers 100, 200 as shown and described with respect to FIGS. 1 and 2. In one implementation, the computing device 300, or home controller 300 (used interchangeably) includes processing resources 310, a main memory 320, a read-only memory (ROM) 330, a display 340, and a communication interface 350. The computing device 300 includes at least one processor 310 for processing information stored in the main memory 320, such as provided by a random-access memory (RAM) or other dynamic storage device, for storing information and instructions which are executable by the processor 310. As provided herein, the "microcontroller" or "microprocessor" described throughout can comprise the processor 310 or combination of the processor 310 and main memory 320 as shown and described with respect to FIG. 3. In various embodiments, the microprocessor may be a general-purpose microprocessor, a microcontroller, a combination of one or more microprocessors and/or microcontrollers acting in concert, and/or a touch sensor specific integrated circuit incorporating, or connected to, one or more of these processing configurations. The main memory 320 also may be used for storing temporary variables or other intermediate information during execution of instructions to be executed by the processor 310. The computing device 300 may also include the ROM 330 or other static storage device for storing static information and instructions for the processor 310.

The communication interface 350 enables the computing device 300 to communicate over one or more control networks 380 (e.g., Bluetooth, Zigbee, Wi-Fi, etc.) through use of one or more wireless network links. Using the network links, the computing device 300 can communicate with one or more home devices, one or more servers or third-party intermediary communication module. The executable instructions in the memory 320 can include gesture interpretation instructions 322, which the computing device 300 can execute to determine gestures performed by users on a particular control groove or on the display screen 340, and generate control commands for the appropriate home device accordingly. For example, the processor 310 can execute the gesture interpretation instructions 322 to receive signals from the sensors 360 coupled to the control groove(s) and/or touch sensors of the display, and generate control commands based on the detected gestures.

The executable instructions stored in memory 320 can also include control connectivity instructions 324, which the computing device 300 can execute to selectively connect the communication interface 350 to various home devices to transmit the generated control commands by the processor 310 executing the gesture interpretation instructions 322. As described herein the computing device 300 may be connected via a wired connection to one or more home devices 370 (e.g., light elements), or can implement wireless network protocols to connect with smart home devices via the control network 380 to transmit the control commands.

In some embodiments, the home controller 300 may be coupled to AC controller 390, for example by clips that provide for an electrical connection to be made between spring clips or pogo pins on one side (e.g., the home controller 300 or the AC controller 390) and electrically conductive pads on the corresponding side. AC controller 390 may include connections to wall wiring for line, load, neutral, and/or ground wires, and in some embodiments, may include L1 and L2 outputs for 3-way configurations. In some embodiments, AC controller 390 may include an AC microcontroller which receives instructions from home controller 300, and which may control field effect transistors, triac(s), and/or other dimming mechanisms, for example as discussed above. In certain examples, the AC controller 390 can include a dimming FET 395 connecting the AC controller 390 to a line wire and load wire of existing wiring (e.g., of a light switch). In the example shown in FIG. 3, the load wire connects the AC controller 390 to the one or more wired home devices 370 (e.g., lights), and the line wire connects the AC controller 390 (an home device controller 300) to a power source 399.

Figure 4:
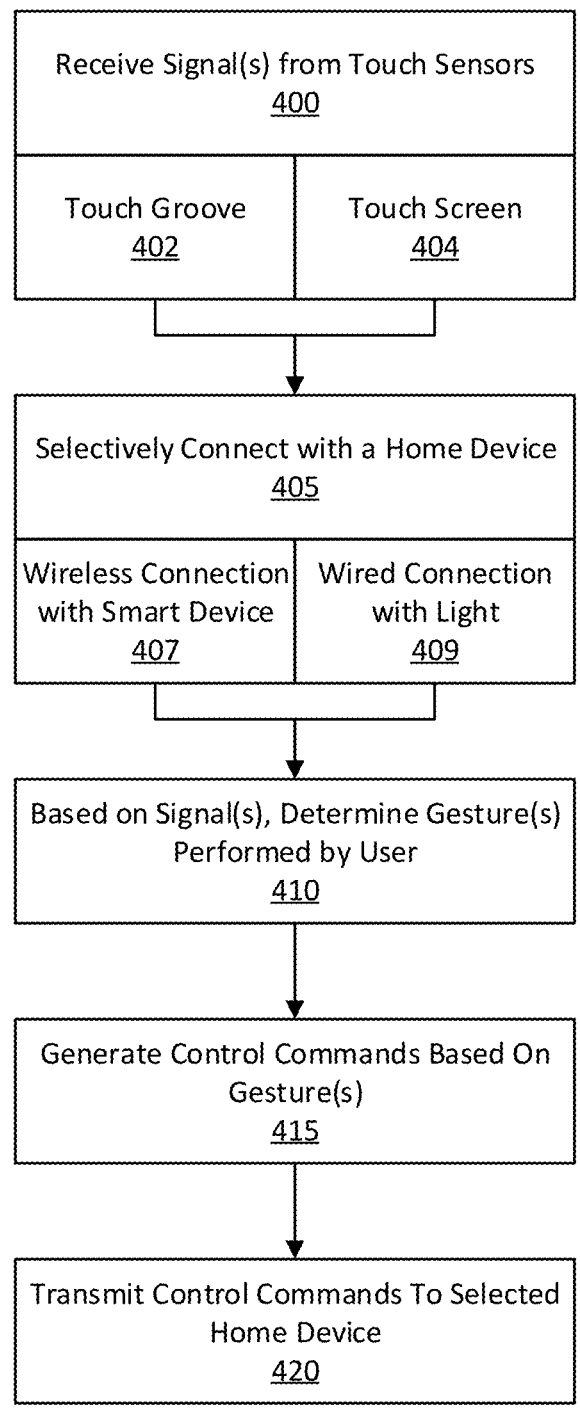
FIG. 4 is a flow chart describing an example of a method of controlling one or more home devices using a home device controller, according to various implementations.

The processor 310 is configured with software and/or other logic to perform one or more processes, steps and other functions described with implementations, such as described with respect to FIGS. 1-2, 4 and elsewhere in the present application. Examples described herein are related to the use of the computing device 300 for implementing the techniques described herein. According to one example, those techniques are performed by the computing device 300 in response to the processor 310 executing one or more sequences of one or more instructions contained in the main memory 320. Such instructions may be read into the main memory 320 from another machine-readable medium. Execution of the sequences of instructions contained in the main memory 320 causes the processor 310 to perform the process steps described herein. In alternative implementations, hard-wired circuitry may be used in place of or in combination with software instructions to implement examples described herein. Thus, the examples described are not limited to any specific combination of hardware circuitry and software.

FIG. 4 is a flow chart describing an example of a method of controlling one or more home devices using a home device controller, according to various implementations. In the below description of FIG. 4, reference may be made to reference characters representing like features as shown and described with respect to FIGS. 1-3. Furthermore, the processes described in connection with FIG. 4 may be performed by a controller or processing resources of an example home device controller 300 of FIG. 3, which can include the control panels 101, 201 as shown and described with respect to FIGS. 1 and 2.

Referring to FIG. 4, a controller of the home device controller can receive one or more signals from touch sensors (400). The touch sensors can be included or operatively coupled to a touch control groove 102 (402) a touch screen 202 of the home device controller (404). In various examples, the controller can selectively connect the home device controller with a home device (405). In certain aspects, the connection can comprise a wired connection with a light element (409), and/or a wireless connection with a smart home device (407), such as those described throughout the present disclosure. In one example, the signals can correspond to a user selection from a displayed menu of smart home devices and a gesture performed on one of the touch screen or a touch control groove of the home device controller.

Based on the received signals, the controller can determine a gesture performed by the user (410). As described herein, the gesture can comprise a tap gesture, a scroll or swipe gesture (up or down), or a touch-hold and scroll gesture. Based on the gesture, the controller can generate control commands for the connected or selected home device (415), and transmit the control commands to the home device. As described herein, the control commands can comprise dim level commands for a light, audio volume commands, window actuator commands, temperature control commands, fan speed commands, and the like.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A home device controller comprising:
a touch screen that displays a selectable menu listing one or more home devices;
a wireless communication interface to communicate, over one or more wireless networks, with one or more home devices;
a wired interface coupled to one or more light elements;
one or more touch grooves disposed adjacent to the touch screen, wherein each of the one or more touch grooves comprises a length and a depth to facilitate a finger of a user in operating the touch groove;
one or more touch sliders each being operatively coupled to a corresponding touch groove of the one or more touch grooves; and
one or more processors executing instructions that cause the home device controller to:
receive signals from each respective touch slider of the one or more touch sliders, the signals corresponding to a touch gesture performed by the user interacting with the touch groove corresponding to the respective touch slider;
based at least in part on the signals, generate control commands executable by a first home device from the one or more home devices or the one or more light elements;
transmit the control commands to the first home device for execution;
receive a user input on the touch screen selecting a second home device of the one or more home devices wirelessly connected to the home device controller;
in response to the user input, reconfigure a selected touch groove of the one or more touch grooves to enable wireless control of the second home device using the selected touch groove, wherein the executed instructions cause the one or more processors to control the second home device based on user inputs performed on the selected touch groove;
subsequent to reconfiguring the selected touch groove, receive signals corresponding to a first user gesture performed at any location on the touch screen and a second user gesture performed at any location on the touch screen;
determine whether the first user gesture performed at any location on the touch screen comprises a touch control gesture or a home device selection gesture;
in response to determining that the first user gesture performed at any location on the touch screen comprises a touch control gesture, (i) generate a set of control commands for the second home device based on the received signals corresponding to the user gesture performed on the touch screen, and (ii) transmit, over the one or more wireless networks, the set of control commands to the second home device for execution;

determine whether the second user gesture performed at any location on the touch screen comprises a touch control gesture or a home device selection gesture; and in response to determining that the second user gesture performed at any location on the touch screen comprises a home device selection gesture, reconfigure the selected touch groove to enable control of a home device that corresponds to the home device selection gesture.

2. The home device controller of claim 1, wherein the first home device comprises a light element from the one or more light elements, and wherein the control commands comprise a dim level command to increase or decrease a brightness of the light element.

3. The home device controller of claim 2, wherein the executed instructions cause the home device controller to transmit the dim level command as a manipulated output waveform on a load line to the light element.

4. The home device controller of claim 2, wherein the second home device comprises a second light element wirelessly connected to the home device controller, and wherein the executed instructions cause the home device controller to transmit the dim level command to the second light element over the one or more wireless networks via the wireless communication interface.

5. The home device controller of claim 1, wherein the second home device comprises one of a temperature control system, a fan controller, a window controller, or an audio controller.

6. The home device controller of claim 1, wherein the touch slider comprises a plurality of capacitive touch sensors.

7. A non-transitory computer readable medium storing instructions that, when executed by one or more processors of a home device controller, cause the home device controller to:

receive signals from a touch slider of the home device controller, the signals corresponding to a touch gesture performed by a user interacting with a touch groove of the home device controller, wherein the touch groove comprises a length and a depth to facilitate a finger of the user in operating the touch groove;

based at least in part on the signals, generate control commands executable by a first home device of either (i) one or more home devices in communication, over one or more wireless networks, with a wireless communication interface of the home device controller, or (ii) one or more light elements coupled to a wired interface of the home device controller;

transmit the control commands to the first home device for execution;

receive a user input on a touch screen of the home device controller, the user input selecting a second home device of the one or more home devices wirelessly connected to the home device controller, wherein the touch screen is disposed adjacent to the touch groove of the home device controller;

in response to the user input, reconfigure the touch groove to enable wireless control of the second home device using the touch groove, wherein the executed instructions cause the one or more processors to control the second home device based on user inputs performed on the touch groove;

subsequent to reconfiguring the touch groove, receive signals corresponding to a first user gesture performed at any location on the touch screen and a second user gesture performed at any location on the touch screen;

determine whether the first user gesture performed at any location on the touch screen comprises a touch control gesture or a home device selection gesture;

in response to determining that the first user gesture performed at any location on the touch screen comprises a touch control gesture, (i) generate a set of control commands for the second home device based on the received signals corresponding to the user gesture performed on the touch screen, and (ii) transmit, over the one or more wireless networks, the set of control commands to the second home device for execution;

determine whether the second user gesture performed at any location on the touch screen comprises a touch control gesture or a home device selection gesture; and in response to determining that the second user gesture performed at any location on the touch screen comprises a home device selection gesture, reconfigure the selected touch groove to enable control of a home device that corresponds to the home device selection gesture.

8. The non-transitory computer readable medium of claim 7, wherein the first home device comprises a light element from the one or more light elements, and wherein the control command comprises a dim level command to increase or decrease a brightness of the light element.

9. The non-transitory computer readable medium of claim 8, wherein the executed instructions cause the home device controller to transmit the dim level command as a manipulated output waveform on a load line to the light element.

10. The non-transitory computer readable medium of claim 8, wherein the second home device comprises a light element wirelessly connected to the home device controller, and wherein the executed instructions cause the home device controller to transmit the dim level command to the light element via the wireless communication interface.

11. A computer-implemented method of controlling home devices, the method being performed by one or more processors of a home device controller and comprising:

receiving signals from a touch sensor of the home device controller, the signals corresponding to a touch gesture performed by a user interacting with a touch groove of the home device controller, wherein the touch groove comprises a length and a depth to facilitate a finger of the user in operating the touch groove;

based at least in part on the signals, generating control commands executable by a first home device of either (i) one or more home devices in communication, over one or more wireless networks, with a wireless communication interface of the home device controller, or (ii) one or more light elements coupled to a wired interface of the home device controller;

transmitting the control commands to the first home device for execution;

receiving a user input on a touch screen of the home device controller, the user input selecting a second home device of the one or more home devices wirelessly connected to the home device controller, wherein the touch screen is disposed adjacent to the touch groove of the home device controller;

in response to the user input, reconfiguring the touch groove to enable wireless control of the second home device using the touch groove, wherein the one or more processors control the second home device based on user inputs performed on the touch groove;

subsequent to reconfiguring the touch groove, receiving signals corresponding to a first user gesture performed at any location on the touch screen and a second user gesture performed at any location on the touch screen;

determining whether the first user gesture performed at any location on the touch screen comprises a touch control gesture or a home device selection gesture;

in response to determining that the first user gesture performed at any location on the touch screen comprises a touch control gesture, (i) generating a set of control commands for the second home device based on the received signals corresponding to the user gesture performed on the touch screen, and (ii) transmitting, over the one or more wireless networks, the set of control commands to the second home device for execution;

determining whether the second user gesture performed at any location on the touch screen comprises a touch control gesture or a home device selection gesture; and in response to determining that the second user gesture performed at any location on the touch screen comprises a home device selection gesture, reconfiguring the selected touch groove to enable control of a home device that corresponds to the home device selection gesture.

* * * * *